April 18, 1961 R. A. DRAGHI ET AL 2,980,003
CAMERA SHUTTER
Filed Dec. 3, 1956 15 Sheets-Sheet 1

INVENTORS
ROBERT A. DRAGHI
& CARL MAYBLOM
BY
Moses, Nolte & Nolte
ATTORNEYS

April 18, 1961 R. A. DRAGHI ET AL 2,980,003
CAMERA SHUTTER
Filed Dec. 3, 1956 15 Sheets-Sheet 2

INVENTORS
ROBERT A DRAGHI
& CARL MAYBLOM
BY
Moses, Nolte & Nolte
ATTORNEYS April 18, 1961 R. A. DRAGHI ET AL 2,980,003
CAMERA SHUTTER
Filed Dec. 3, 1956 15 Sheets-Sheet 10

INVENTORS
ROBERT A. DRAGHI
& CARL MAYBLOM
BY
Moses, Nolte + Nolte
ATTORNEYS

April 18, 1961 R. A. DRAGHI ET AL 2,980,003
CAMERA SHUTTER
Filed Dec. 3, 1956 15 Sheets-Sheet 13

INVENTORS
ROBERT A. DRAGHI
& CARL MAYBLOM
BY
Moses, Nolte + Nolte
ATTORNEYS

United States Patent Office 2,980,003
Patented Apr. 18, 1961

2,980,003

CAMERA SHUTTER

Robert A. Draghi, 37 Fern St., Floral Park, N.Y., and Carl Mayblom, Woodside, N.Y.; said Mayblom assignor to said Draghi Filed Dec. 3, 1956, Ser. No. 625,723

3 Claims. (Cl. 95—63)

The instant invention relates to camera shutter driving mechanism for photographic aerial cameras, and in particular, shutting ring structure and driving means for a between-the-lens shutter.

The need for high efficiency and high speed shutters for aerial cameras is well known. Numerous attempts have been made to construct shutter ring structures having a pair of movable leaves which leaves open and close the exposure aperture under the control of various types of driving mechanisms. The most advanced of the prior art designs for aerial between-the-lens shutters contemplates, in effect, two complete and mechanically complex shutters in one. This prior art device incorporates independent first and second shutter mechanisms each operating respective sets of shutter leaves. Since the two sets of leaves and respective driving mechanisms are independent of one another, it is difficult to sustain timing of one set of leaves in respect to the other for rapid speed operation. At times, one set of leaves tends to fire before the other set has completed its operation or conversely, if readjusted, tends to fire too late. In either case, accurate and controlled time exposure is difficult to realize.

The instant invention contemplates sustained optimum shutter operation by a mechanically simple and single shutter drive mechanism and accommodating ring structure that will insure high shutter speeds. The invention contemplates shutter apparatus meeting the test of shutter speeds in the order of one three hundredth of a second and capable of long life, high efficiency operation.

It is, therefore, the principal object of the instant invention to provide a driving mechanism for between-the-lens camera shutter having two concentrically supported independently rotatable rings, one within the other, said rings having shutter leaves pivoted to open and close upon travel of respective rings driven by a single powered main cam acting upon correlated actuating levers for each ring and thereby providing accurate, reliable, positive timing during the entire shutter operation and thereby ensuring the exact time interval of shutter exposure by the opening of an initially closed set of leaves and the closing of an initially opened set of leaves by the single powered main cam.

It is another object of the instant invention to provide a high speed shutter drive mechanism for an aerial camera between-the-lens shutter having a minimum of movable parts and of simple and reliable construction to achieve consistently, reliable, long-life, high efficient operation, economy of manufacture, ease of disassembly to service same, and including the advantages of having extremely high shutter speeds operated with a minimum of deleterious jar or shutter vibrations.

It is a further object of the instant invention to provide a driving mechanism for a between-the-lens camera shutter having two concentrically supported independently rotatable rings, one within the other, each having shutter leaves pivoted to open and close upon travel of respective rings; both rings being driven by a single powered main cam acting upon correlated actuating levers for each ring wherein an initially closed set of leaves is driven open and initially open set of leaves is closed; subsequently, the first set of leaves is closed and the second set of leaves opened to complete the cycle of operation.

It is a further object of the instant invention to provide an adjustable timing control for controlling the exposure of a between-the-lens camera shutter having two concentrically supported independently rotatable rings, one within the other, said rings having shutter leaves pivoted to open and close upon travel of respective rings driven by a single powered main cam acting upon correlated actuating levers for each ring, said controlling means including a pivotal retard segment subjected to regulated uniform travel by means of register with a pair of juxtaposed mutually engaged pallets, which segment may be pre-set to vary time exposure by the amount of its extension into the path of rotation of said main cam thereby retarding rotation of same to control the time interval between opening a first set of leaves initially closed and closing a set of leaves initially opened.

It is a further object of the instant invention to provide a driving mechanism for between-the-lens camera shutter having two concentrically supported independently rotatable rings, one within the other, said rings having shutter rings pivoted to open and close upon travel of respective rings driven by a single powered main cam acting upon correlated actuating levers for each ring wherein deleterious impacts to the shutter ring structure is avoided by a single retard snubber segment adapted to decelerate main cam rotation prior to cam engagement of ring levers.

Other objects and advantages will become apparent from the following description taken in conjunction with the drawings in which:

Figs. 9 through 15, inclusive, are cut-away sectional views showing the sequence of shutter operation for one complete cycle of main cam rotation;

Fig. 32 shows the assembly of the double pallets in an engaged position; whereas, Fig. 33 is an exploded perspective view of the two pallets;

Fig. 34 is a plan view of the shutter rings seated in a center ring and held therein by ring retainers; whereas.

Referring to the figures, a camera shutter is encased in a shutter housing 40. A speed adjustment control 41, a winding station 42 and a trip station 43 are mounted on an inner end wall 44 of housing 40. Referring now to Figs. 2 to 5, winding station 42 supports a spring biased plunger 45 at the upper end of a hollowed winding housing 46. Plunger 45 engages a holding cam 47. Cam 47 is adapted to turn counterclockwise, as viewed in Fig. 5 to wind a power storing spring 48 suspended in the interior of housing 46. A keycup 49 is supported at the upper side of holding cam 47. A bearing race 50 supports cam 47 for rotation. An inverted spring cup 51 is suspended in housing interior by a cam shaft 52. Cup 51 has a shank 53 extending coaxially through spring 48 to prevent wobble.

Shank 53 has a lower terminating end spaced from the upper end of a centrally disposed hollow sleeve 54 of an upright spring cup 55 suspended at the lower end of winding housing 46. Cups 51, 55 are operatively coupled by reversed turned ends 56 of winding spring 48 registering with respective cup slots 57. The noncircular bore 58 of lower cup sleeve 54 receives a correspondingly shaped upper end of a power transmitting shaft 59 of a multi-eccentric main cam 60.

Figures 17, 18, 19, 20, 21:
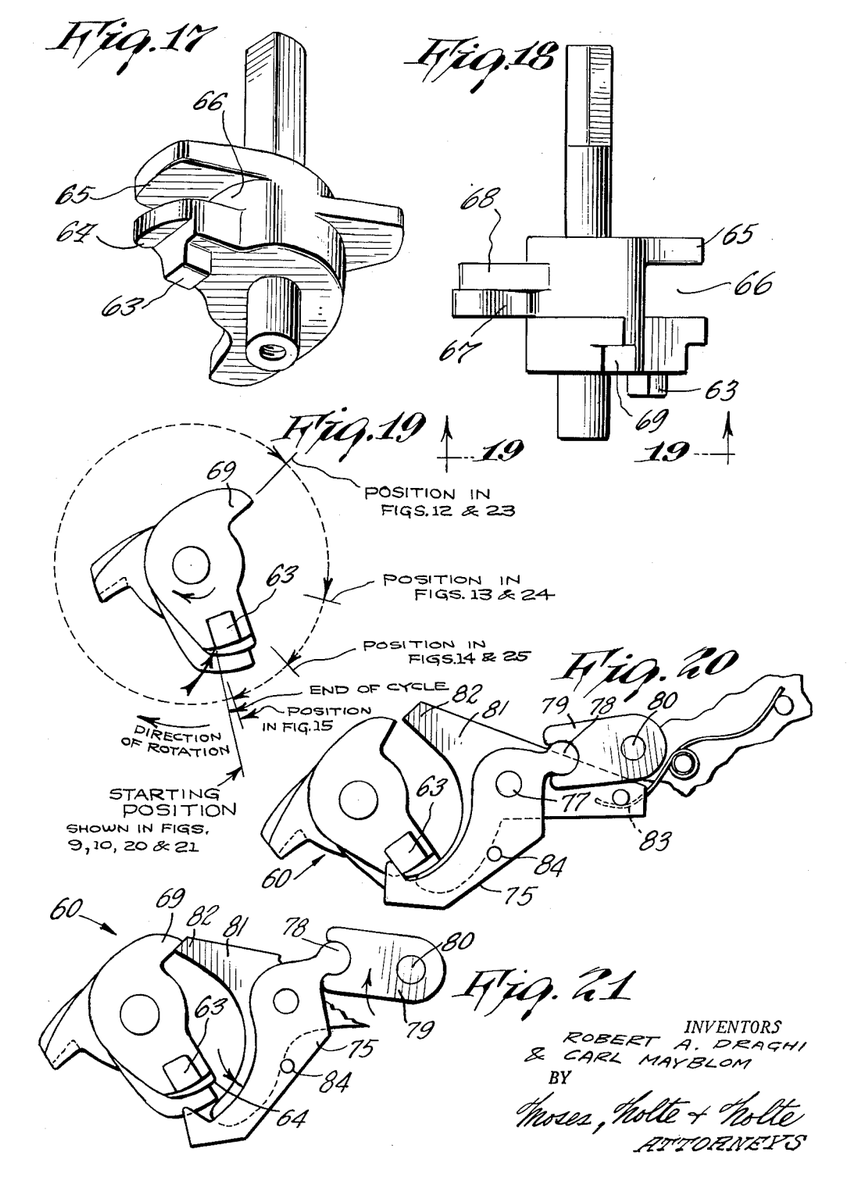
Fig. 17 is a perspective view of the single powered main cam incorporating the improvements of the instant invention.
Fig. 18 is a longitudinal elevation of main cam oriented to show the side thereof hidden in the view of Fig. 17.
Fig. 19 is a plan view of main cam looking upward from lines 19—19 of Fig. 18 and correlates cam motion with other figures illustrating different positions of the driving mechanism.
Fig. 20 shows main cam engagement at the time winding station is being energized and prior to release of trip station.
Fig. 21 shows main cam released by latching lever but latched by stop lever prior to rotation upon return of trip station to its initial position.

The lower shaft end of main cam 60 is suspended in a bearing sleeve 61 supported in an outer bearing casting 62. Main cam 60 has radially extending eccentrics disposed along the longitudinal axis of its shaft. Eccentrics are disposed in spaced apart horizontal planes. Referring to Figs. 17 and 18, the first group of eccentrics include a trip stop 63 at the lowest vertical level, a snubber cam eccentric 64 spaced two levels above and extending radially beyond trip stop 63, and a radially extending "A" ring actuating eccentric 65 spaced above snubber cam eccentric 64. An operating clearance 66 exists between snubber cam eccentric 64 and actuating eccentric 65 to permit main cam 60 rotation. Main cam 60 has a second group of eccentrices including a retard eccentric 67 one level below a "B" ring actuating eccentric 68. Retard eccentric 67 and "B" ring eccentric 68 lie in the plane of operating clearance 66. Continuing clockwise from the second group of eccentrics, main cam 60 has a cam stop eccentric 69 extending radially therefrom and disposed in a horizontal level between trip stop 63 and snubber cam eccentric 64.

It will be seen hereinafter that main cam 60 is latched upon winding power spring 48 in a counterclockwise direction which causes the upper end of spring 48 to turn relative to the lower end thereof. When unlatched, cam 60 will rotate counterclockwise relative to the stationary upper cup 51, the latter now being latched by plunger 45 engaging hold cam 47.

Figure 1:
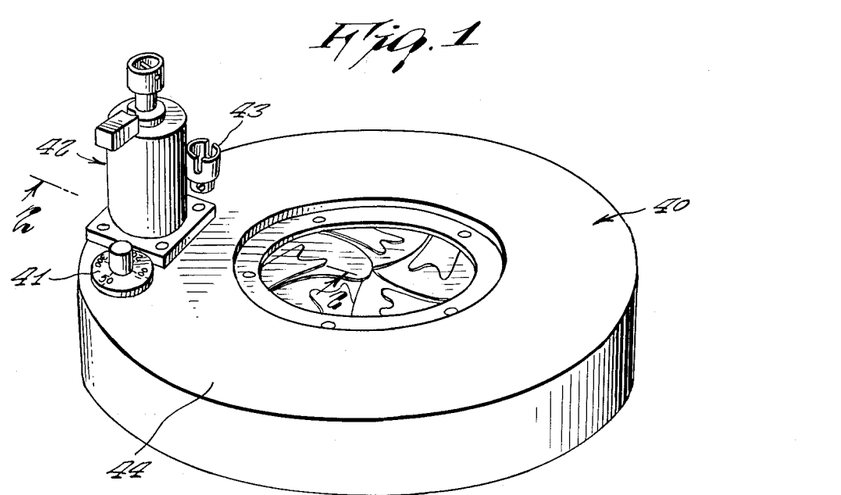
Fig. 1 is a perspective view of a shutter housing incorporating the improvements of the instant invention showing a speed control station, a winding station and a trip station mounted on the inner end wall of said housing.
Figure 2:
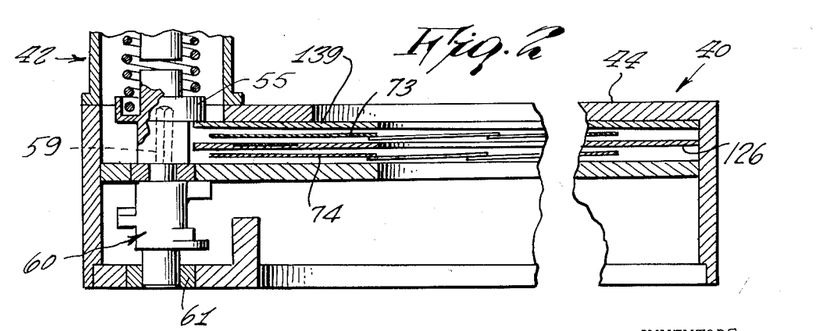
Fig. 2 is a cut-away sectional view taken along lines 2—2 of Fig. 1.
Figure 3:
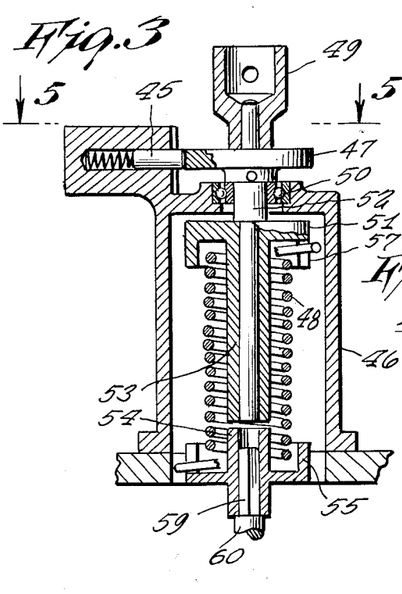
Fig. 3 is a cut-away sectional longitudinal elevation of said winding station showing the interior thereof.
Figure 4:
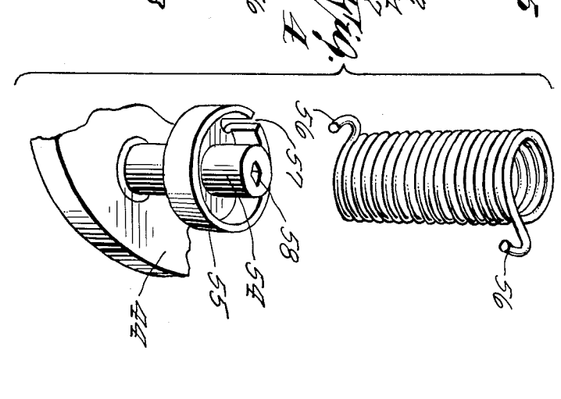
Fig. 4 is a perspective view of the winding station spring and lower spring cup.
Figure 5:
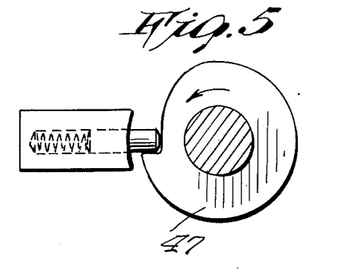
Fig. 5 is a sectional view taken along lines 5—5 of Fig. 3.
Figure 6:
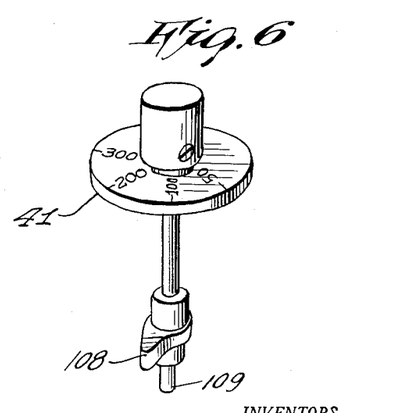
Fig. 6 is a perspective view of the speed control station showing its complete assembly.
Figure 16:
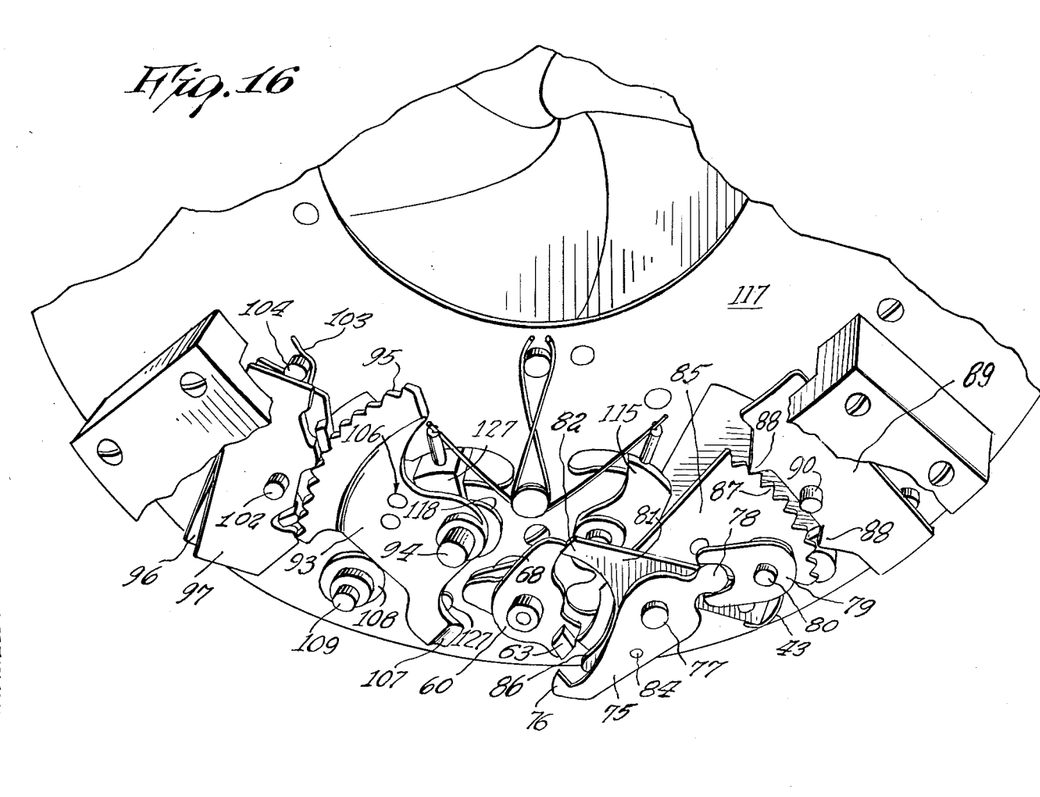
Fig. 16 is a cut-away perspective view looking at the bottom of a shutter drive mechanism incorporating the improvements of the instant invention.

Referring now to the Fig. 16, a power transmitting mechanism links main cam 60 to a pair of shutter rings 70, 72 thereby operating respective shutter leaves 73, 74. A rockable latching lever 75 is hooked at one end 76 to engage trip stop eccentric 63. Lever 75 is pivoted on a shaft 77 by a swivelsocket connection 78 to a trip lever 79 suspended from and turnable with a trip station shaft 80. Trip shaft 80 is connected directly to trip station 43 (Fig. 1). A cam stop lever 81 is rockably suspended from shaft 77 and lies in a horizontal level below latching lever 75. Cam stop lever 81 has an arm 82 adapted to swing into the path of travel of cam stop eccentric 69. Cam stop lever 81 is biased for counterclockwise rotation (as viewed in Fig. 16) by a spring 83 (Fig. 20). Cam stop lever 81 is also operatively linked to latching lever 75 (Fig. 20) by a pin 84 depending from latching lever 75 and abutting an edge of cam stop lever 81.

A snubber segment 85 is rockably suspended from shaft 77 and has an edge 86 (Fig. 36) adapted to extend into the line of travel of snubber eccentric 64. A snubber serrated edge 87 operatively engages two spaced apart teeth 88 (Fig. 16) of a rockable snubber pallet 89. Pallet 89 is suspended from a spring biased shaft 90. A spring 91 engages a depending pin 92 on segment 85 and biases segment 85 for clockwise rotation, as observed in Fig. 36.

Figure 31:
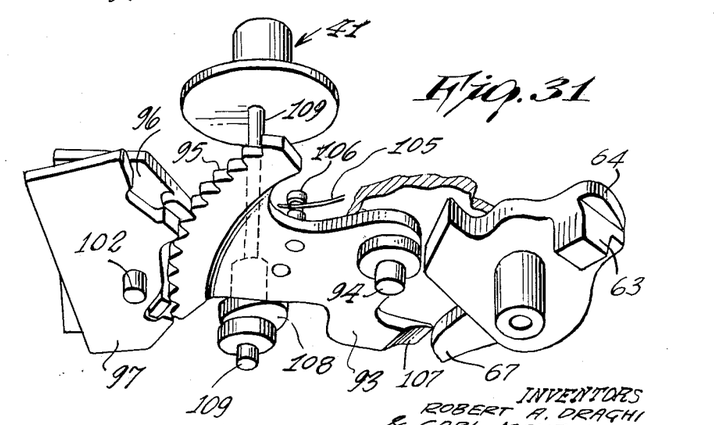
Fig. 31 is a cut-away perspective view showing the details of the adjustable time exposure control including mutually engaged pallets engaging retard segment which in turn is adapted to engage main cam to effect time exposure control.
Figures 32, 33:
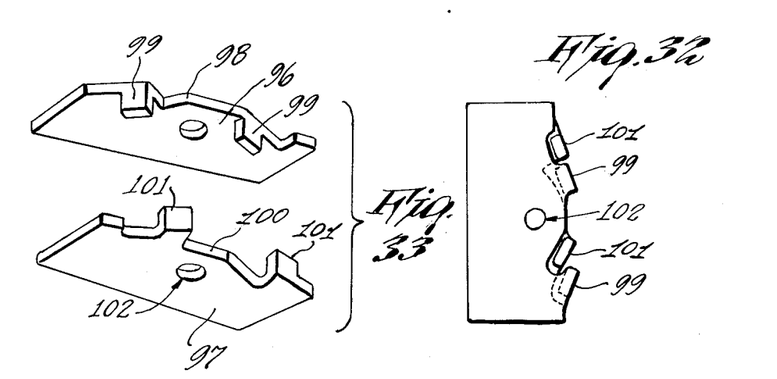

A retard snubber segment 93 (Fig. 16) is rockably suspended from a shaft 94 on the other side of main cam 60. Retard segment 93 has a serrated edge 95 operatively registering with upper and lower pallets 96, 97. Upper pallet plate 96 has an irregularly recessed operating edge 98 (Figs. 31-33) from which two spaced apart pallet teeth 99 depend. Lower pallet plate 97 has an irregularly recessed operating edge 100 from which two spaced apart pallet teeth 101 extend upwardly therefrom. Operating edges 98, 100 are shaped to provide travel clearance for the juxtaposed teeth 99, 101 upon alternate engagement with serrated edge 95 during travel of retard snubber 93.

Pallets 96, 97 are pivotally suspended from a shaft 102 (Fig. 16). Shaft 102 is biased by a spring 103 having an end engaging a depending pin 104. Snubber segment 93 is biased for counterclockwise rotation about shaft 94, as viewed in Fig. 31, by a spring 105 engaging a depending pin 106.

Figures 36, 37, 38, 39:
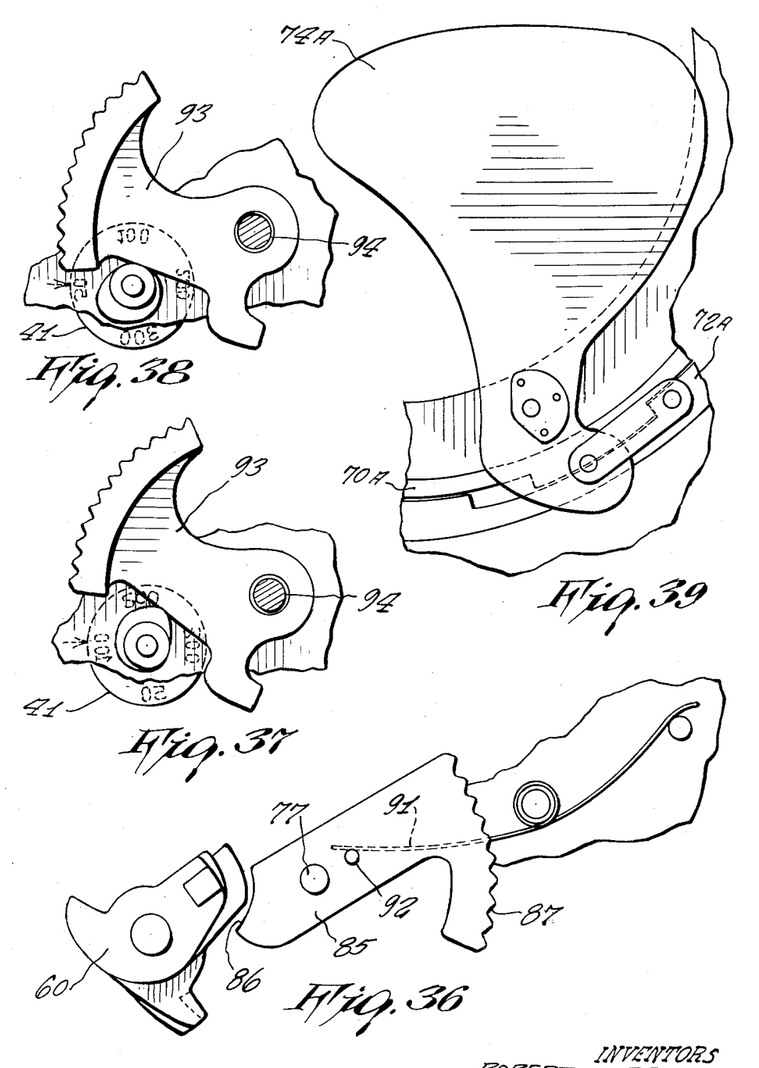
Fig. 36 schematically illustrates the relative positions of main cam and snubber segment prior to engagement, which engagement takes place almost at the completion of main cam revolution.
Figs. 37 and 38 show schematically the relative positions of the speed control cam upon engaging retard segment for different settings of speed control station.
Fig. 39 shows a structural modification for linking a shutter leaf to its respective ring.
Figure 40:
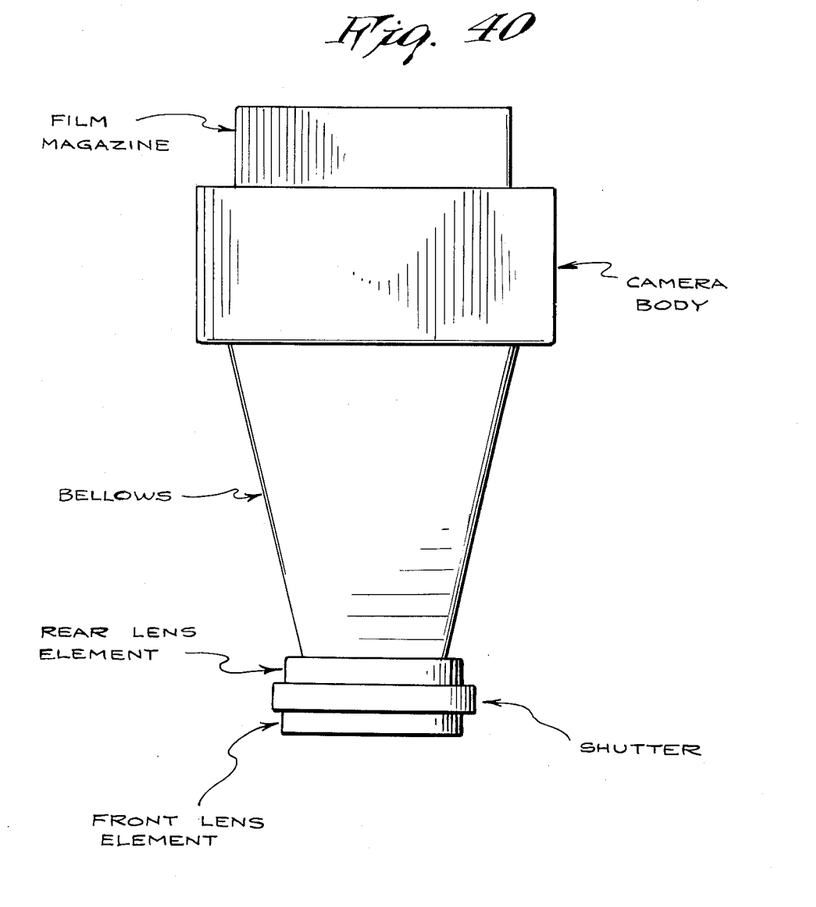
Fig. 40 illustrates schematically the relative positions of the components of a between-the-lens shutter for an aerial camera incorporating the improvements of the instant invention in which the shutter is disposed between front and rear lenses, bellows interconnect the rear lens with the camera body, and a rear film magazine is mounted to the latter.

Segment 93 is provided with a beveled snubber arm 107 (Fig. 31) adapted to extend into line of travel of retard eccentric 67. Segment 93 is also provided with an edge operatively engaged by timing cam 108 suspended from and turnable with a shaft 109 of speed control station 41. Segment 93 occupies its extreme counterclockwise position when engaged by the greatest radially projecting portion of cam 108, as illustrated in Figs. 16 and 37. When beveled snubber arm 107 lies outside of the line or rotation of snubber eccentric 67, and main cam 60 is free to rotate without being latched temporarily by snubber arm 107 of snubber segment 93. Segment arm 107 is drawn into the path of rotation of eccentric 67 for other settings of cam 108. The amount arm 107 extends into path of rotation depends upon setting of speed control 41. When arm 107 is disposed to engage eccentric 67, main cam 60 is temporarily latched and its rotation retarded. As main cam 60 rotates clockwise, it will push snubber segment 93 clockwise around shaft 94 as viewed in Fig. 31. Rotation of main cam 60 is retarded in a manner determined by the initial position of arm 107 and segment travel passed double pallets 96, 97. The double pallet engaging structure provides a more controllable and uniform travel of segment 93. Upon clearing segment arm 107 by main cam 60, said cam becomes completely unlatched and is prepared to fulfill its cycle of rotation.

Figure 26:
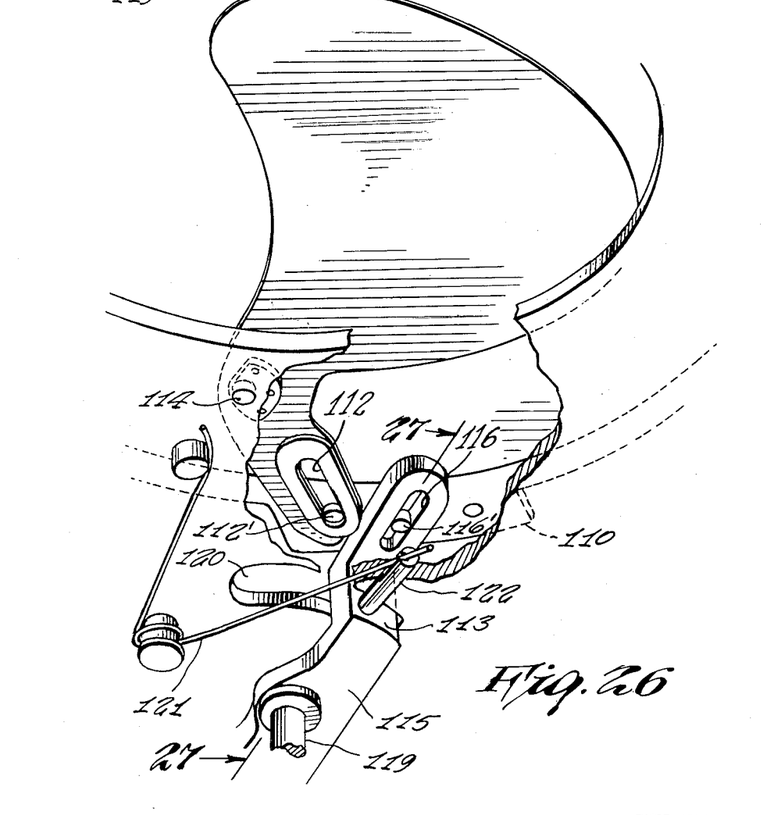
Fig. 26 is a cut-away, sectional, perspective view showing the operating plane of shutter "A" leaf and the "A" actuating lever coupled to the "A" ring.
Figure 26A:
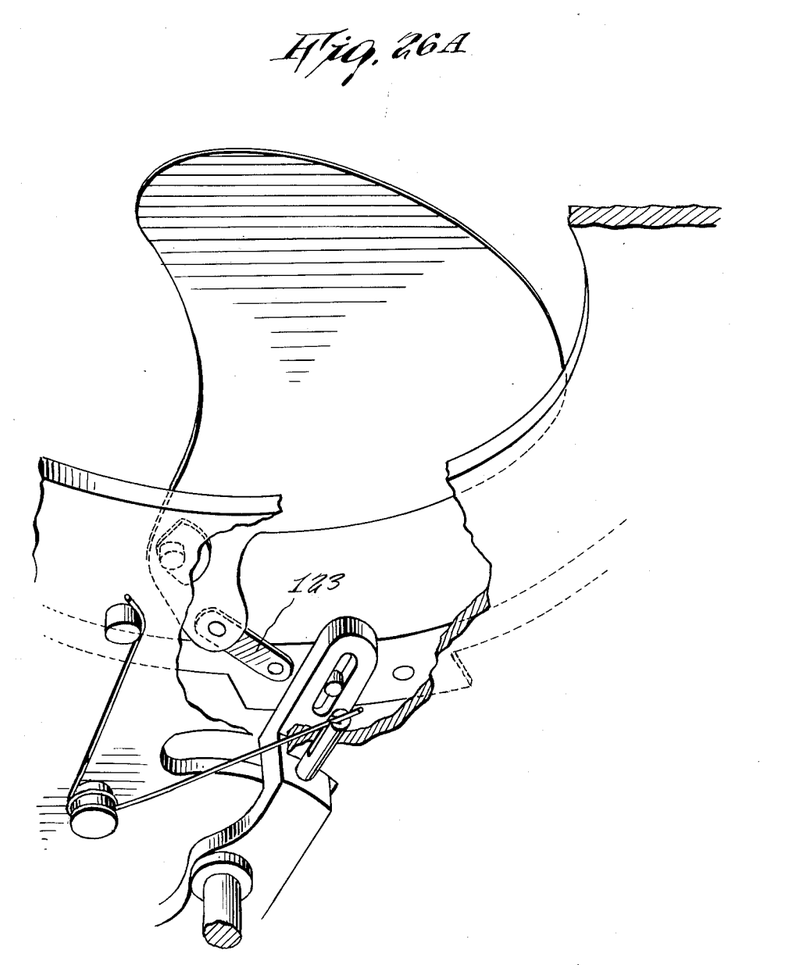
Fig. 26A shows a structural modification for linking shutter leaf to "A" ring.
Figure 27:
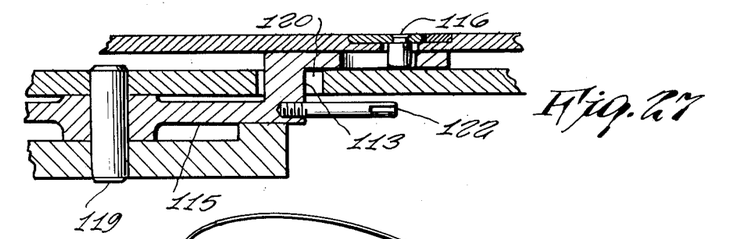
Fig. 27 is a cut-away sectional view taken along lines 27—27 of Fig. 26.

Two concentrically supported independently rotatable rings 70, 72, one within the other, support respective shutter leaves 73, 74. Leaves 73, 74 are pivoted to open and close upon corresponding ring travel. Inner "A" ring 70 has five mutually spaced apart outwardly extending lugs 110 recessed between five mutually spaced apart inwardly extending lugs 111 of "B" rings 72. The recesses between lugs provide travel clearance to allow respective rings to oscillate, one relative to the other. Referring now to Figs. 26, 27, each "A" shutter leaf 73 is operatively coupled by a pin in an elongated slot 112 below the under surface of a correlated lug 110 on "A" ring 70. Shutter leaves 73 are suspended from ring 70 to pivot about depending pivotal pins 114 engaging bearing sleeves 135 in an upper bearing plate 117. Clockwise rotation of ring 70, as viewed in Fig. 26, pivots shutter leaves 73 to open shutter aperture formed thereby. "A" ring 70 is driven by an actuating pivoted lever 115 operatively coupled to the under surface of one of "A" ring lugs 110 carrying a pin engaging an elongated slot 116. Lever 115 has an intermediate vertical portion 113 extending through clearance 120 provided in upper bearing plate 117 and an outwardly extending cam engaging face 118 below plate 117. Face 118 is adapted to extend into the path of rotation of eccentric 65. Lever 115 is pivotally suspended from a shaft 119. As viewed in Fig. 26, lever 115 pivots counterclockwise when engaged by eccentric 65 of main cam 60 and which urges ring 70 clockwise to open shutter leaves 73. Shutter leaves 73 are closed by a biasing spring 121 engaging stud 122 threaded to lever 115 when eccentric 65 is withdrawn from face 118 upon main cam rotation. Fig. 26A illustrates a modification for operatively connecting the "A" leaf 73 to ring 70 by a link 123 pivoted at its ends to under surface of lug 110 and to upper surface of the leaf. As noted hereinbefore, engagement of eccentric 65 and lever face 118 opens shutter aperture formed by "A" leaves 73, whereas, spring 121 urges ring 70 to rotate in the direction to close shutter aperture.

Figure 28:
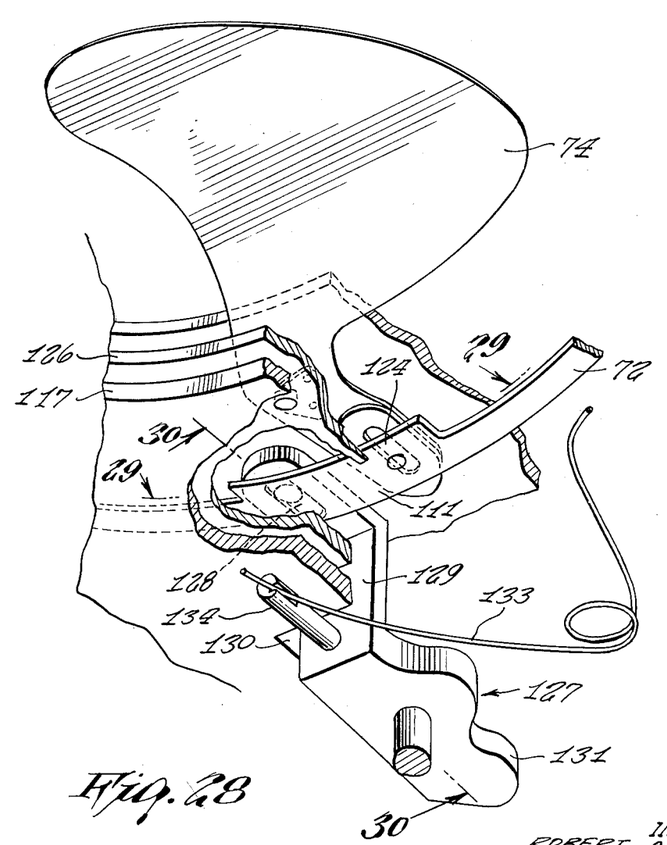
Fig. 28 is a cut-away, sectional, perspective view showing the operating plane of shutter "B" leaf and the "B" actuating lever connected to the "B" ring.
Figure 28A:
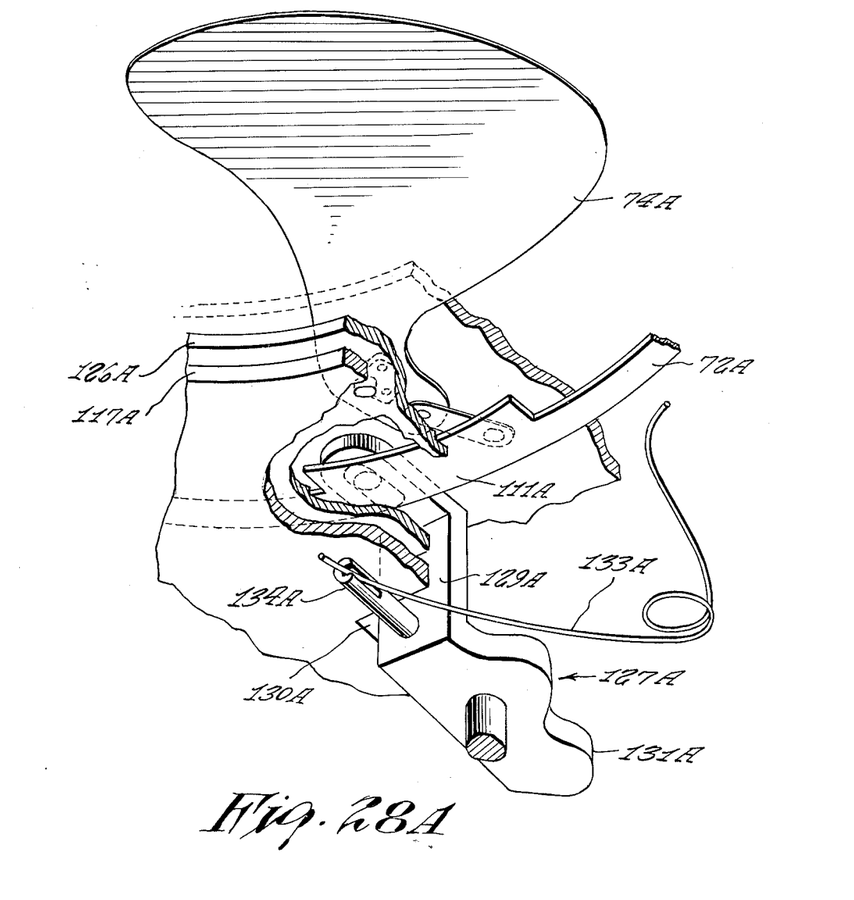
Fig. 28A shows a modified embodiment for mechanically coupling "B" shutter leaf to "B" ring.
Figure 29:
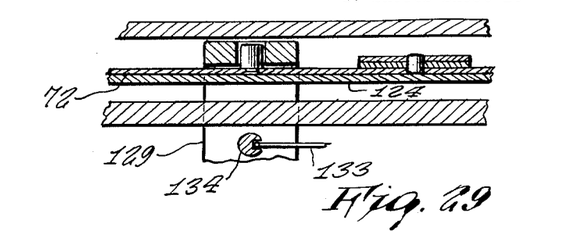
Figs. 29 and 30 are cut-away sectional views taken, respectively, along lines 29—29 and 30—30 of Fig. 28.
Figure 30:
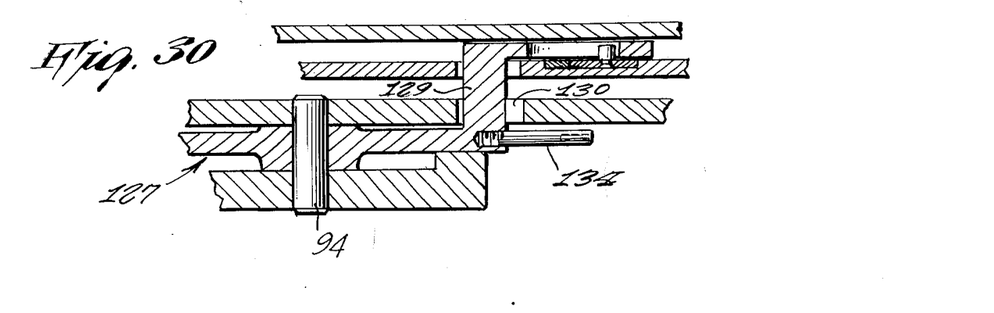

Each "B" shutter leaf 74 is suspended above "B" ring 72 and operatively coupled thereto by a pin and elongated slot 124 to respective lugs 111. In Fig. 28, clockwise travel of "B" ring 72 causes "B" leaves 74 to open. Each leaf 74 turns about a depending pivotal pin 125 engaging respective bearing sleeves 132 suspended in a center ring 126. "B" ring 72 is driven by a "B" actuating lever 127 coupled to one of the "B" ring lugs 111 by a pin and elongated slot 128. Lever 127 has a vertical portion 129 extending beyond the outer edge of center ring 126 and through a clearance 130 in upper bearing plate 117. At its lower end, lever 127 bends over to form a cam engaging face 131. Lever 127 is suspended from and turnable with shaft 94. Engaging face 131 lies in a plane below (as viewed in Fig. 16) retard segment 93. Engaging face 131 is adapted to extend into the path of rotation of eccentric 68. In Fig. 28, lever 127 pivots clockwise upon engagement of face 131 with eccentric 68 which in turn pivots ring 72 counterclockwise to close shutter aperture formed by "B" leaves 74. When eccentric 68 is withdrawn from lever 127 upon rotation of main cam 60, a biasing spring 133 engaging a stud 134 threaded to lever 127 urges ring 72 to rotate in a direction to open the shutter aperture. Fig. 28A illustrates a modification for operatively connecting leaves 74 to ring 72 by a link 136 pivoted at its ends to upper surface of respective lugs 111 and to under surface of correlated leaves 74.

Figures 7, 8:
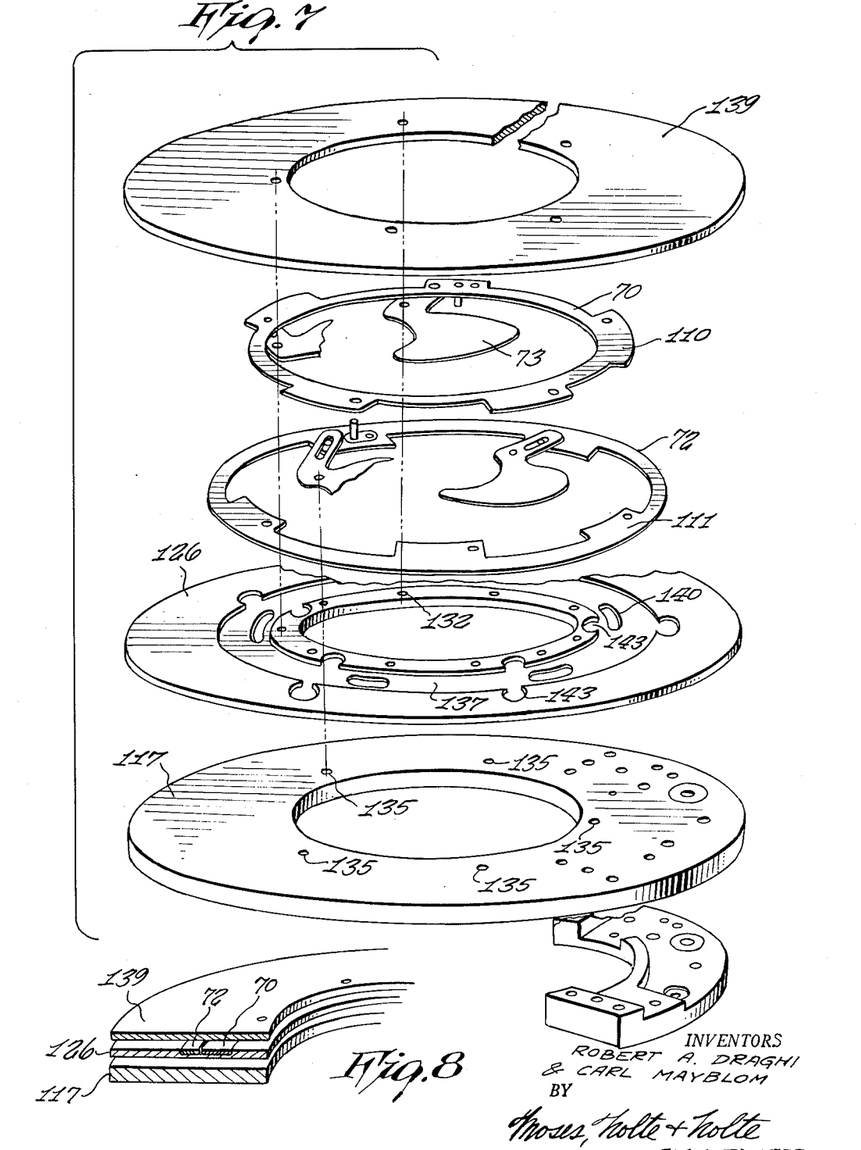
Fig. 7 is an exploded view of the shutter leaves ring assembly and accommodating bearing structure.
Fig. 8 is a cut-away cross-section showing the relative positions of the assembled shutter ring structure.
Figure 34:
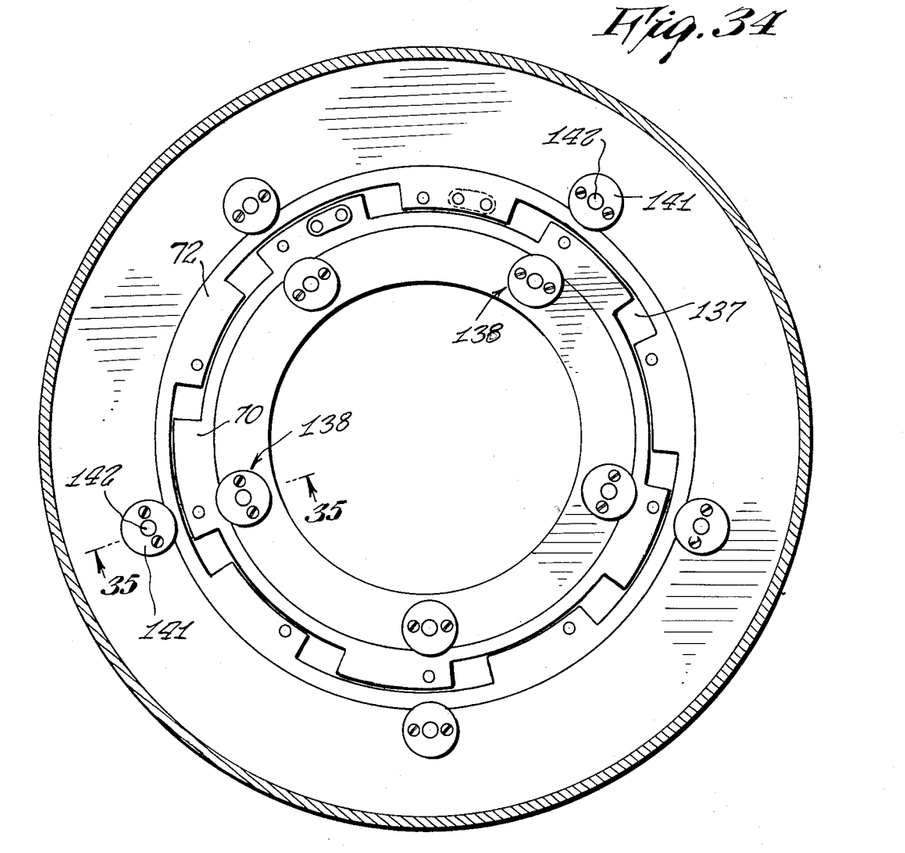
Figure 35:
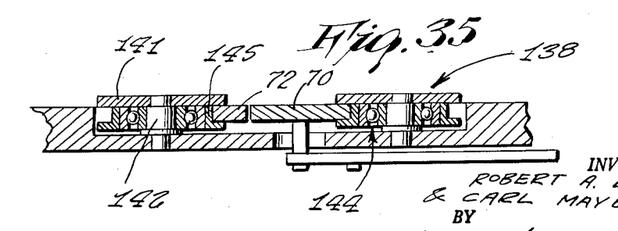
Fig. 35 is a cut-away sectional view taken along lines 35—35 of Fig. 34.

Fig. 7 is an exploded view of the shutter leaves structure. "A" and "B" rings 70, 72 are suspended within an annular recess 137 in center ring 126 by mutually spaced apart similar ring retainers 138 better illustrated in Figs. 34 and 35. Retainers 138 are lodged in recesses 143 along both sides of recess 137. The assembled ring structure is suspended by spacers (not shown) between an inner ring 139 and outer plate 117. Center ring 126 is provided with five mutually spaced apart slots 140 through which depending pins 112' from lugs 110 extend, which pins are a part of pin 112'-elongated slot 112 for respective "A" leaves 73. One of the slots 140 also clears pin of the pin 116'-slot 116 combination. Five outer retainers 138 serve to hold "B" ring 72 in recess 137 whereas five inner retainers 138 serve to hold "A" ring 70 in recess 137. Retainers 138 have turnable discs 141 overlapping respective rings. Discs 141 are mounted to upper ends of thrust bearing shafts 142. Shafts 142 carry ball bearing racers 144 having outer flanged segments 145 turnable with respective rings. Rings 70, 72 are suspended for rotation between respective discs 141 and flanged segments 145.

In operation, main cam 60 will rotate clockwise, as viewed in Figs. 16 and 19. Power spring 48 is energized by winding same during which time trip stop eccentric 63 is latched by hook 76 to maintain power cam 60 stationary. Shutter operation is prepared by turning trip station 43 approximately 10° in a direction to cause trip lever 79 to turn clockwise, as viewed in Fig. 16, which reflects in counterclockwise rotation of latch lever 75 and causes spring biased stop lever 81 under influence 83 (Fig. 21) to turn counterclockwise and project into the line of rotation of cam stop eccentric 69 to engage same. Thus main cam 60 is still maintained stationary although subsequently trip stop 63 is cleared by hook 76. Fig. 20 shows the relative positions these drive mechanism components prior to turning of trip station 43, i.e., hook 76 latched to trip stop 63 whereas stop lever arm 82 clears stop eccentric 69. Fig. 21 shows the relative positions of the components after trip station 43 is revolved; hook 76 of lever 85 clears trip stop 63 but stop lever arm 82 holds cam stop eccentric 69.

Rotation of main cam 60 is commenced by returning trip station 43 to its original position which returns latch lever 75 toward main cam 60 and causes depending pin 84 of lever 75 to pivot stop lever 81, the latter in turn releases stop eccentric 69. These components are mutually disposed so that alternate turning of trip station 43 causes stop lever 81 to engage stop eccentric 69 before latch lever 75 releases trip eccentric 63, and conversely, stop lever 81 disengages stop eccentric 69 before latch lever 75 can reengage trip stop eccentric 63.

Figures 9, 10:
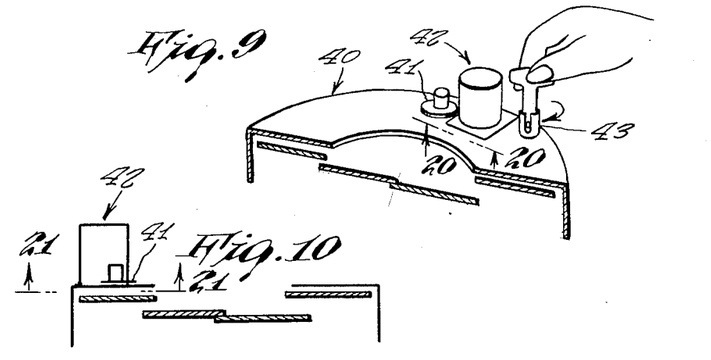
Fig. 9 shows the "B" shutter leaves closed and trip station being turned to initiate cam operation.
Fig. 10 is a side elevation of Fig. 9.
Figure 11:
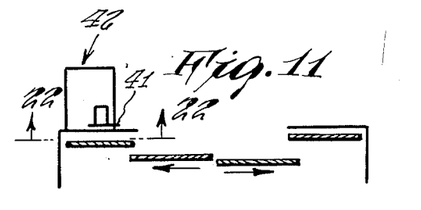
Fig. 11 shows "B" leaves starting its open travel.
Figure 12:
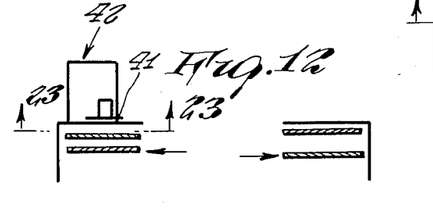
Fig. 12 shows "B" leaves fully opened to provide film exposure.

Main cam 60 commences one power revolution after being released by stop lever 81. Figs. 9 through 15 illustrate the sequence of shutter operation for the relative positions of main cam 60 during its cycle of operation. "B" leaves 74 are initially closed prior to rotation of main cam 60; whereas, "A" leaves are initially opened. Fig. 9 illustrates closed "B" leaves and opened "A" leaves and the direction for turning trip station 43 to pivot trip lever 79 to cause stop lever 81 to release stop eccentric 69. Main cam rotation first causes "B" leaves 74 to open in order to provide film exposure; "A" leaves 73 next are closed to trap light. The sequence is illustrated in Figs. 11 and 12. Subsequently, "B" leaves 74 close, Fig. 14, and then "A" leaves 73 open, Fig. 15, after which main cam 60 returns to its starting position.

Figures 22, 23, 24, 25:
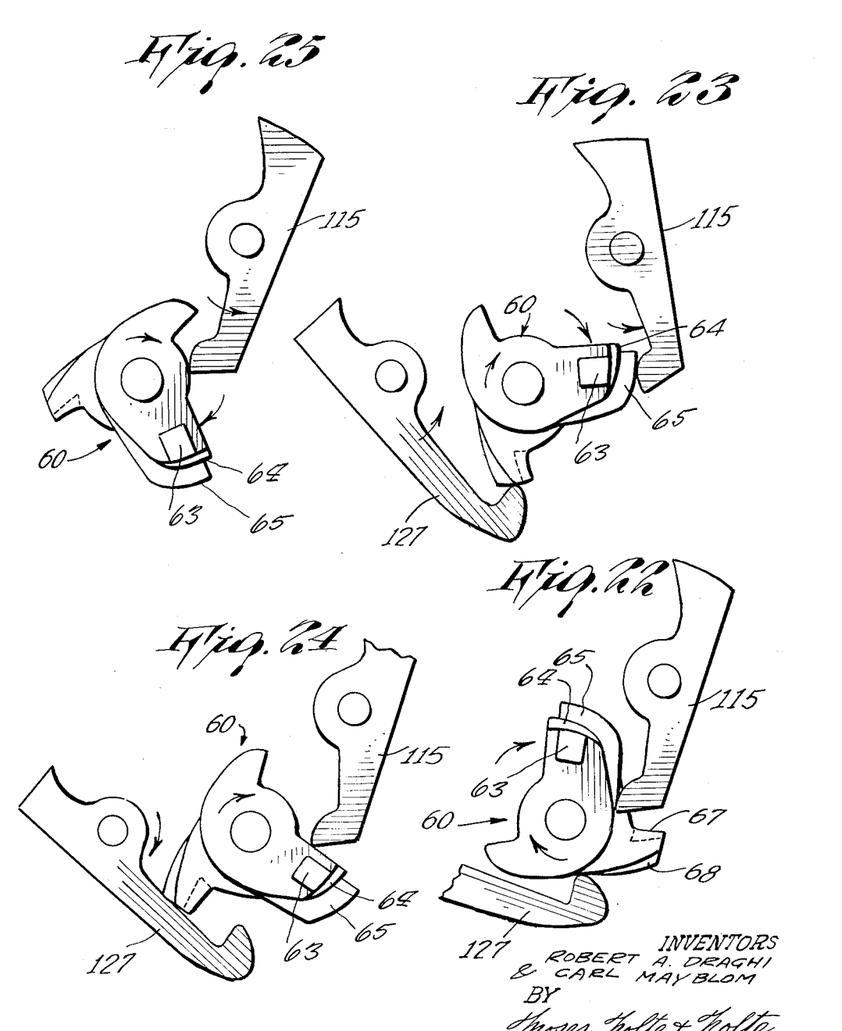
Figs. 22 through 25, inclusive, show main cam operatively engaging the respective actuating ring levers for different main cam positions along its cycle of rotation.

To continue the description of main cam operation, it will be assumed that speed adjustment control 41 is set for maximum exposure hence arm 107 is positioned to lie outside the path of rotation of retard eccentric 67, in which case, main cam 60 is not temporarily latched thereby. Upon main cam rotation, eccentric 68 releases "B" lever 127 (Fig. 28) whereupon biasing spring 133 turns "B" lever 127 to open shutter aperture formed by "B" leaves 74 as illustrated schematically in Fig. 23. Further turn of cam 60 causes eccentric 65 to release "A" lever 115 (Fig. 26) whereupon biasing spring 121 pivots "A" ring 70 and "A" leaves 73 close shutter aperture as illustrated schematically in Fig. 24. As main cam 60 completes about 340° rotation, schematically illustrated in Fig. 36, snubber eccentric 64 arrives in position to engage shock absorbing snubber edge 86 which engagement decelerates rotation of main cam 60 and thus prevents respective eccentrics imparting destructive, shattering impacts to the shutter ring structure. Thereafter, "B" eccentric 68 reengages "B" lever 127 to close "B" leaves 74; and subsequently "A" eccentric 65 engages "A" lever 115 to open "A" shutter leaves 73. Main cam is finally brought to standstill by hook 76 latching trip stop 64 which completes the cycle of rotation of main cam 60.

Figure 13:
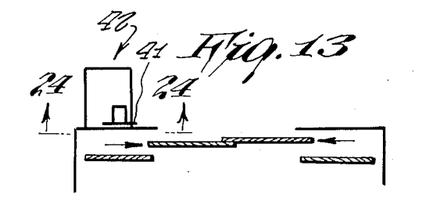
Fig. 13 shows "A" leaves closed.
Figure 14:
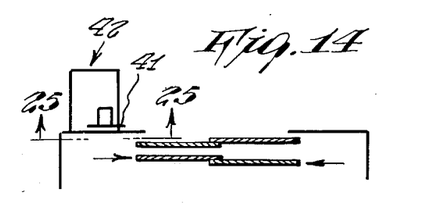
Fig. 14 shows "B" leaves closed.
Figure 15:
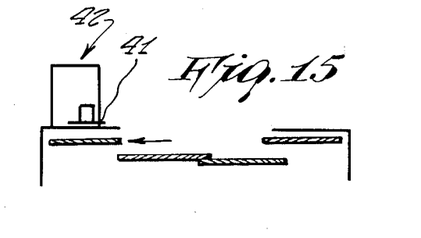
Fig. 15 shows "A" leaves open which completes the cycle of operation of the shutter leaves.

The foregoing description assumes a speed control adjustment wherein segment arm 107 lies outside of path of travel of main cam 60 to establish one particular exposure time. Different time exposures are arrived at by varying the time interval between opening of "B" leaves 74 and subsequent closing of "A" leaves 73. This time interval can vary by adjusting speed control 41 and hence the amount of projection of arm 107 into the line of rotation of main cam 60. The extent of projection of arm 107 in path of rotation of eccentric 67 correspondingly controls the time interval between opening of "B" leaves 74 (Fig. 12) and closing of "A" leaves 73 (Fig. 12). Engagement with arm 107 temporarily latches cam 60. After pivoted by main cam 60, segment 93 is returned to its starting position by biasing spring 105 (Fig. 13).

Fig. 39 shows another structural variation mechanically coupling a shutter leaf to its ring supporting structure. A link is pivoted at its respective ends to the ring lug and the heel of the shutter leaf.

Speed adjusting control shown herein is operated mechanically. It is within the scope of the invention to use electrical means for operating same.

We have described what we believe to be the best embodiments of our invention. We do not wish, however, to be confined to the embodiments shown, but what we desire to cover by Letters Patent is set forth in the appended claims.

We claim:

1. A two ring action camera shutter comprising two concentrically supported independently rotatable rings, one ring being within the other, a first shutter leaf pivoted on one of said rings and having a portion engageable by the other of said rings and being movable to an opened and a closed position by relative movement of said rings, means to bias said first leaf to an opened position, a second shutter leaf pivoted on one of said rings and having a portion engageable with the other of said rings and being movable between an opened and closed position by movement of said rings, second means to bias said second shutter leaf to a closed position, a rotatable power cam having a plurality of eccentrics for actuating said ring operation in a predetermined sequence, said eccentrics comprising a lower cam stop portion, a shock-absorbing radially-extending portion above said cam stop portion, a latch stop portion protruding from the lower face of said cam stop portion, and radially offset first and second shutter leaf actuating cam portions, means for energizing said power cam for rotation, said energizing means including a latch member engageable with said latch stop portion for latching said cam while energizing same and means for releasing said latch member from said cam for initiation of rotation of said cam, first lever means connected to said first leaves and engageable with said first shutter leaf actuating cam portions to close said first shutter leaves, and movable out of contact therewith to permit opening of said first shutter leaves by said biasing means upon rotation therepast, second lever means connected to said second leaves and engageable with said second shutter leaf actuating cam portion to open said second shutter leaves and movable out of contact therewith to permit closing of said second shutter leaves by said biasing means and means engageable with said shock absorbing eccentric portion of said cam for retarding said cam in preparation to cam actuation of said levers whereby to suppress destructive acceleration impacts to said leaves.

2. A two ring action camera shutter according to claim 1, wherein said power cam includes a radially extending snubber cam portion adjacent said first and second shutter leaf cam actuating portions, and including displaceable snubber means engageable with said cam snubber eccentric portion of said power cam to control the speed of rotation thereof.

3. A two ring action camera shutter according to claim 2, including timing means engageable with said displaceable snubber means to control the movement thereof whereby to vary the speed of said cam and the timing of said camera exposure.

References Cited in the file of this patent

UNITED STATES PATENTS

| 1,377,366 | Rose | May 10, 1921 |
| 1,963,324 | Deckel et al. | June 19, 1934 |
| 2,168,893 | Aiken | Aug. 8, 1939 |
| 2,354,168 | Aiken | July 18, 1944 |
| 2,601,286 | Henry | June 24, 1952 |
| 2,718,835 | Fuerst | Sept. 27, 1955 |

FOREIGN PATENTS

| 894,957 | Germany | Oct. 29, 1953 |